United States Patent [19]

Shatto, Jr.

[11] Patent Number: 4,674,915

[45] Date of Patent: Jun. 23, 1987

[54] MANIPULATOR APPARATUS FOR GRIPPING SUBMERGED OBJECTS

[75] Inventor: Howard L. Shatto, Jr., Houston, Tex.

[73] Assignee: Shell Offshore Inc., Houston, Tex.

[21] Appl. No.: 799,682

[22] Filed: Nov. 19, 1985

[51] Int. Cl.[4] .............................................. B63C 11/00
[52] U.S. Cl. ................................. 405/191; 248/205.8;
248/362; 114/312; 114/250; 294/64.3; 414/744 B; 901/40; 166/356
[58] Field of Search .................... 405/12, 13, 188, 190,
405/191, 224; 248/205.8, 205.9, 362, 363;
114/312, 330, 249, 250, 296; 294/64.1, 64.3;
414/737, 744 B, 752; 901/40

[56] References Cited

U.S. PATENT DOCUMENTS

| 3,154,306 | 10/1964 | Elliot et al. | 294/64.1 |
|---|---|---|---|
| 3,165,899 | 1/1965 | Shatto | 405/191 |
| 3,406,837 | 10/1968 | Kirsch et al. | 414/744 B |
| 3,720,433 | 3/1973 | Rosfelder | 294/64.1 |
| 3,910,620 | 10/1975 | Sperry | 248/362 |
| 3,912,317 | 10/1975 | Ohnaka | 901/40 |
| 4,043,134 | 8/1977 | Mason | 405/188 |
| 4,221,356 | 9/1980 | Fortune | 248/363 |
| 4,294,424 | 10/1981 | Teissier | 294/64.1 |
| 4,527,783 | 7/1985 | Collora et al. | 294/64.1 |
| 4,627,785 | 12/1986 | Monforte | 901/40 |

Primary Examiner—Cornelius J. Husar
Assistant Examiner—Kristina I. Hall

[57] ABSTRACT

A manipulator apparatus carried by a remotely operated vehicle is provided with a suction device capable of gripping underwater objects. The suction portion of the manipulator apparatus utilizes suction chambers isolated from the body of water. When fluid is removed from the suction chambers an appropriately shaped moveable wall moves inwardly thereby forming a suction cavity between the suction device and the object to be moved.

The moveable wall may take the form of a rubber-like flexible membrane wall or a piston moveable within the suction portion of the manipulator apparatus.

13 Claims, 11 Drawing Figures

FIG. 6
FIG. 7
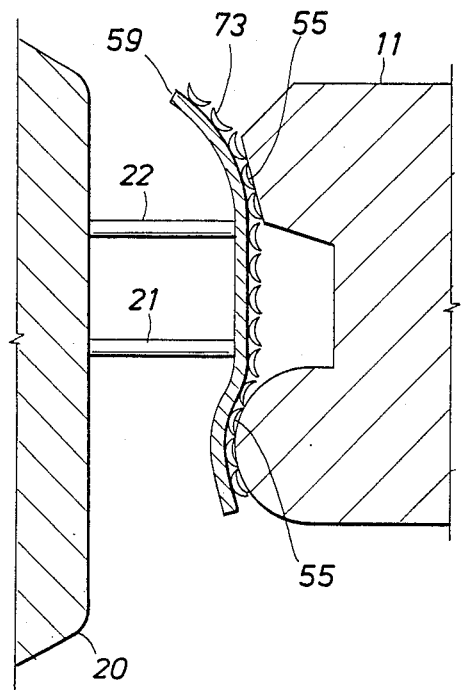
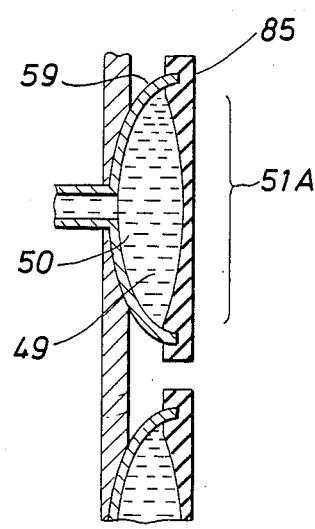
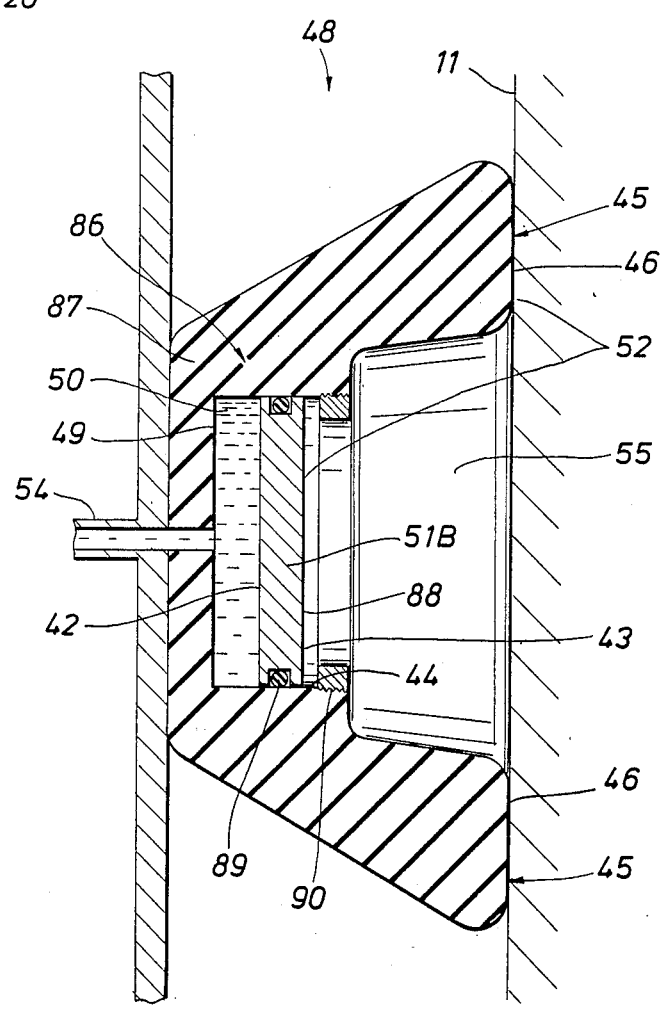
FIG. 8

MANIPULATOR APPARATUS FOR GRIPPING SUBMERGED OBJECTS

This application is related to application Ser. No. 799,679, filed 11/19/85 by H. L. Shatto Jr., titled 'Manipulator Apparatus with Flexible Membrane for Gripping Submerged Objects'.

BACKGROUND OF THE INVENTION

1. Field of the Invention

This invention relates to an apparatus for carrying out operations at underwater installations and pertains more particularly to an apparatus for manipulating equipment in the vicinity of, or which components are located on, an underwater installation, such for example as an underwater wellhead, an underwater oil and gas production facility, storage facilities, etc.

2. Description of the Prior Art

A recent development at offshore locations is the installation of large amounts of equipment underwater used in the production of oil fields and gas fields situated many miles from shore. Many wells are being built in water depths up to 6,000 feet deep, a depth greater than divers can safely work. Thus, in drilling wells, producing wells, installing underwater equipment on the ocean floor, and carrying out workover operations underwater at any of the various ocean floor installations, use has been made of what is known as a manipulator apparatus for gripping submerged objects such as the particular pieces forming the underwater equipment.

Consideration has been given to the use of magnets or electromagnets carried by such a manipulator apparatus by which the manipulator apparatus could be secured to an underwater installation during the time it is carrying out a particular operation thereon. However, in order to combat seawater corrosion, there has been a tendency to make more of the underwater equipment of stainless steel on which electromagnets cannot be used to mount a magnetic manipulator apparatus.

Such gripping devices as set forth in U.S. Pat. No. 3,165,899 issued Jan. 19, 1965, to H. L. Shatto, Jr., and as set forth in U.S. Pat. No. 3,720,433 issued Mar. 13, 1973, to A. M. Rosfelder, disclose such apparatus using primarily suction cups which attach to the underwater object to be manipulated. The suction cups disclosed however, in both of these patents have their suction cavities open to the body of water in which the underwater objects are located. Suction applied through each cup loosens foreign material under the cup and causes the loosened material to be drawn upwards into the pumping system that generates suction at the face of each cup. Such an open suction cup design also requires continuous use of pumping power to compensate for leakage around each suction cup that contacts the underwater object. Additionally, cups which do not contact the underwater object continuously draw in additional sea water which decreases the overall suction gripping force of the entire apparatus.

An apparatus need be disclosed, therefore, that does not require a continuous pumping action upon the face of the suction cups in order to maintain a suction grip upon the underwater object. Such an apparatus should also not ingest within the pumping equipment any foreign material loosened by the suction cup. Such an apparatus should also have a means for sealing off suction cups which are not in contact with the underwater object by means of a device more reliable and more simple than the needle valve arrangement shown, for example, in FIG. 8 of Patent '433.

SUMMARY OF THE INVENTION

The apparatus of the present invention comprises, in simplest terms, a suction cup or a series of suction cups with a moveable wall formed over the normally open portion of the cup. Closure of the open face of the cup, in this manner, overcomes all of the undesirable features of the two previously referenced apparatus disclosed in the patents. The moveable wall may consist of a flexible membrane wall or a moveable piston slideably engaged within a cylinder.

Since the suction cup is sealed across its normally open surface by a moveable wall a continuous pumping action need not be maintained to each suction cup. In other words, once the suction cups are evacuated initially they no longer need to be continuously evacuated to compensate for water seepage around each rim of a previously open suction cup design. A further advantage is that foreign material is no longer ingested into the pumping system. The most important advantage, however, can be realized after studying the geometric limitations of a normally open faced suction cup as disclosed in the two previous patents. The suction cups so disclosed are flat across their open faces and therefore adhere most readily to a flat surface. They become inoperative when they are applied against a surface having more than the gentlest contours.

Study of the apparatus of the present invention, however, discloses that the present apparatus may be capable of adhering to any contoured surface. The sealing surface located around the perimeter of the moveable wall may be geometrically shaped advantageously such that each suction cup may adhere easily to an object of any shape.

It is therefore an object of the present invention to provide a remotely operated vehicle with suitable connector means for securing it to any underwater installation whether made of magnetic or nonmagnetic materials. A further object of the present invention is to provide a manipulator apparatus for use on component parts of underwater installations, which parts are so large or smooth that it is impossible to gauge them by mechanical gripping devices such as a claw arm, hook, etc.

A feature of the present invention is to provide a manipulator apparatus comprising at least one suction member which is operatively engageable to a remotely operated vehicle. The suction member has at least one suction chamber containing fluid defined within the interior of the suction member. A portion of the suction member forms a moveable wall between the suction chamber and a surface of the suction member which is subsequently placed in contact with the object to be manipulated. A further feature of the manipulator apparatus is to provide suction means which are placed in fluid communication with the suction chamber and are capable of removing a portion of the fluid from the chamber. The fluid when removed causes the moveable wall to move inward and form a suction cavity between the surface of the suction member and the object that it is desired to manipulate. The suction cavity so formed exerts a suction grip on the object.

These and other features, objects and advantages of the present invention will become apparent from the following detailed description, wherein reference is made to the figures in the accompanying drawings.

BRIEF DESCRIPTION OF THE DRAWINGS

FIG. 6 is an alternative embodiment of the present invention showing the suction member "pods" mounted on a flexible resilient plate.

FIG. 7 is an alternative embodiment of the present invention showing a flexible membrane wall operatively engaged to shaped portions of a resilient plate.

FIG. 8 is an alternative embodiment of the present invention showing a suction member means having a moveable wall formed from a piston.

DESCRIPTION OF THE PREFERRED EMBODIMENT

Figure 1:
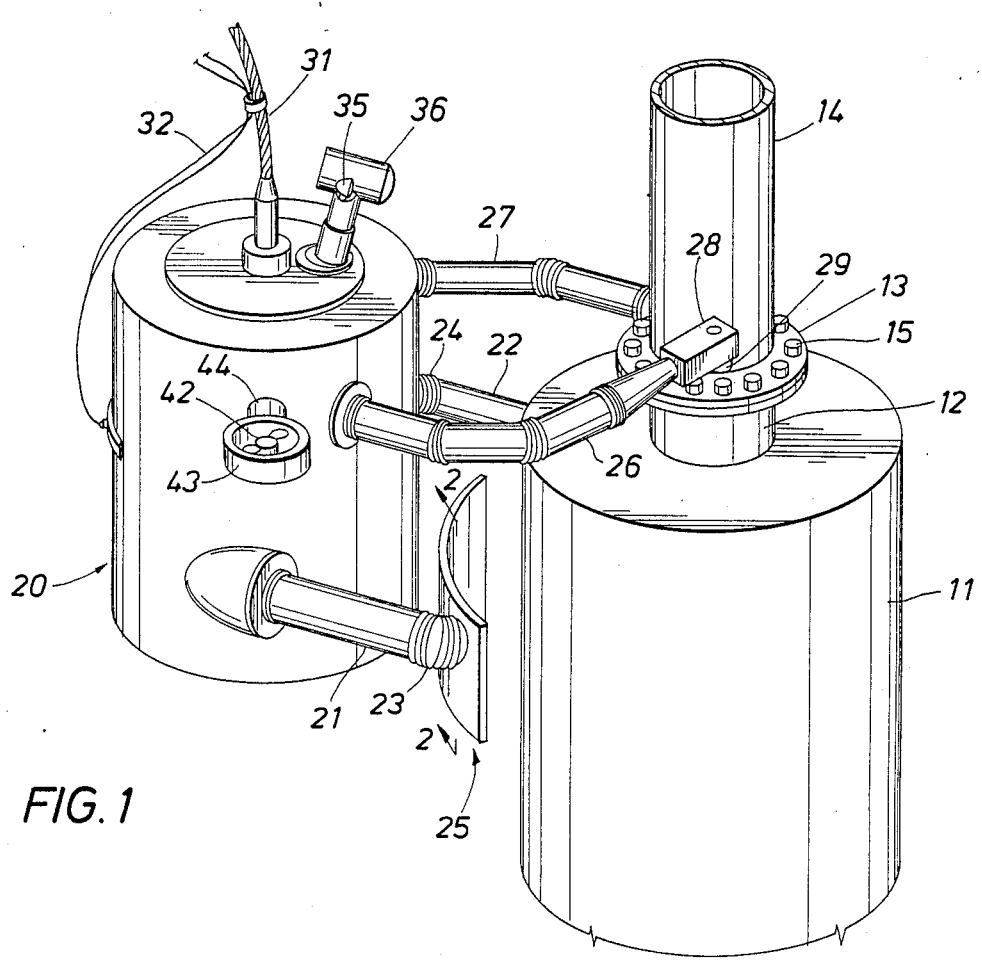
FIG. 1 is an isometric view illustrating a remotely operated vehicle about to engage the manipulator apparatus of the present invention to the smooth outer walls of an underwater cylindrical structure.

Referring now to FIG. 1 of the drawing, an underwater wellhead installation is shown in the form of a large diameter cylindrical structure 11, for example, a tank, footing of a bridge or offshore platform, etc., and having a flanged opening 12 at the upper end thereof to which the lower flanged end 13 of a tubular member 14, such as a pipe or leg, is fixedly secured by means of bolts 15.

Positioned adjacent the underwater cylindrical structure is a remotely operated vehicle 20, hereinafter R.O.V.). The R.O.V. 20 is provided with at least one support or connector device or arm for securing the manipulator device to the underwater installation 11. As shown in FIG. 1 of the drawing, the connector apparatus may take the form of a pair of articulated arms 21 and 22 having one or more flexible joints 23 and 24. It is to be understood that while articulated arms 21, 22 are preferred, the connector means may merely comprise one or more single rigid arms or support members.

Figure 2:
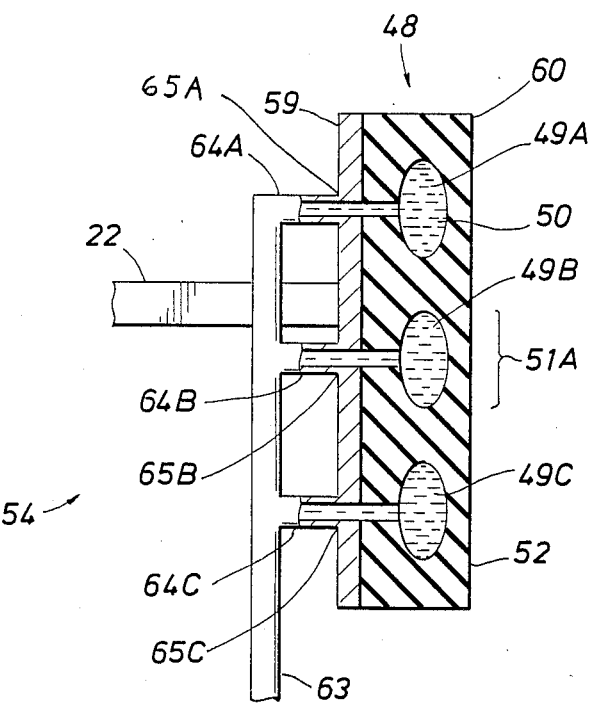
FIG. 2 is a view taken along lines 2—2 of FIG. 1 showing in cross section a preferred embodiment of the manipulator apparatus of the present invention.

Each of the arms 21, 22 is provided at its outer end with suitable suction means in the form of a manipulator apparatus 25, one form of which will be described in more detail with regard to FIG. 2 hereinbelow. The articulated arms 21, 22 may be selectively actuated to move in any desired and possible position.

In addition to the connector arms 21 and 22, the R.O.V. 20 is provided with one or more outwardly-extendible and movable work-engaging arms 26 and 27, which may be articulated as illustrated. A suitable instrument, tool or work-engaging device, such as a mechanically-operated power wrench 28 having a socket head 29 thereon, is mounted for operation at the end of at least one of the arms 26, 27.

A cable 31 is secured to the top of the R.O.V. 20 for lowering the R.O.V. through the water and/or supplying power thereto. Electric power or hydraulic fluid may be transmitted through a separate conduit or conduits 32 into the R.O.V. 20 for energizing the various elements of the R.O.V. 20. The prime mover apparatus, which may be of any suitable type employed to move, extend and retract or position the various arms 21, 22, 26 and 27 with respect to the body member of the R.O.V. 20 or with respect to each other, is contained within the R.O.V. 20, while the circuitry employed to energize and actuate selectively the various elements may be contained in the R.O.V. 20, or in a controller at an operation base above the surface of the water, or split between the two locations.

To aid in operations being carried out by the R.O.V. 20, the R.O.V. 20 is provided with one or more swivel-mounted flood lights 35 and one or more television cameras 36, for lighting the area in the vicinity of the underwater installation and observing operations, respectively.

The R.O.V. 20 may be provided with one or more propellers 42 mounted in an open-sided housing 43 which in turn is rotatably mounted on a shaft or arm 44 and remotely positionable by signals transmitted from the surface through cable 31. The propellers 42 may be driven by uni-directional or reversible motors (not shown). While the R.O.V. 20 is shown as being provided with motor driven propellers 42, it is to be understood that any suitable type of propulsion means may be employed for moving the R.O.V. 20 through the water.

With the R.O.V. 20 positioned adjacent the underwater installation 11, the ROV 20 may be moved toward the cylindrical structure 11 so that the manipulator apparatus 25 of the R.O.V. 20 is positioned substantially flush against the outer surface of the cylindrical structure 11. Suction then would be applied to the manipulator apparatus 25 so as to secure the R.O.V. 20 to the cylindrical structure 11.

Referring now to FIGS. 1, 2, 4, 4A, and 4B the manipulator apparatus 25 of a preferred embodiment is shown operatively engaged to the remotely operated vehicle 20, the vehicle 20 being lowerable through a body of water.

It is well recognized that the apparatus 25 need not be positioned by the R.O.V. 20 adjacent an object 11 to be manipulated, but by any other means known to the art, such as placement by divers, or by lowering from a cable, (not shown).

Referring now more specifically to FIGS. 2, 4, 4A, and 4B the manipulator apparatus 25 can be seen to comprise suction member means 48 which are shown operatively engaged to the vehicle 20, for example, by articulated arms 21, 22. The suction member means 48 can be seen to have in a preferred embodiment a plurality of suction chambers 49A, B, C, each chamber containing a fluid 50 such as hydraulic fluid or seawater well known to the art, each suction chamber 49A, B, and C being defined in the interior of the suction member means 48. The suction member means 48 in a preferred embodiment can be seen to form a moveable wall 51A between a portion of the suction chamber 49 and an outer surface 52 of the suction member means 48 which is placed in contact with the object such as structure 11 shown in FIG. 1 to be manipulated.

Figure 4:
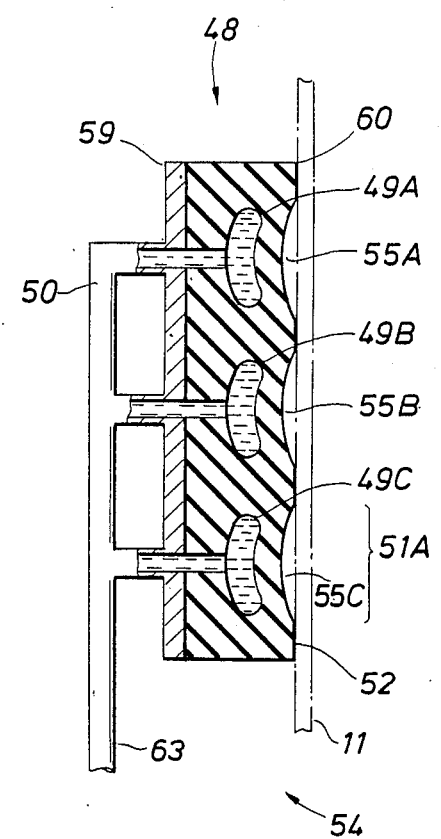
FIGS. 4, 4A and 4B show the suction cavities formed after evacuation of a portion of the fluid from within the suction chambers of the manipulator apparatus.
Figure 4A:
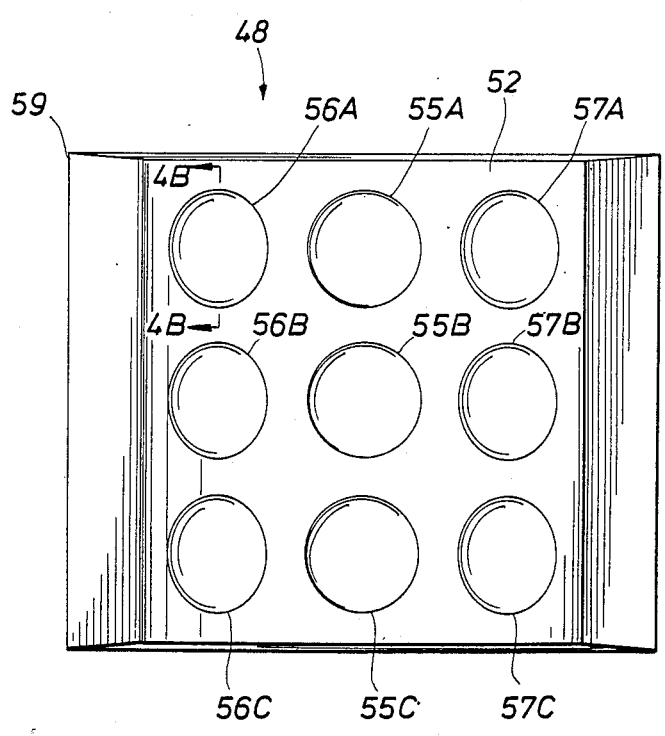
Figure 4B:
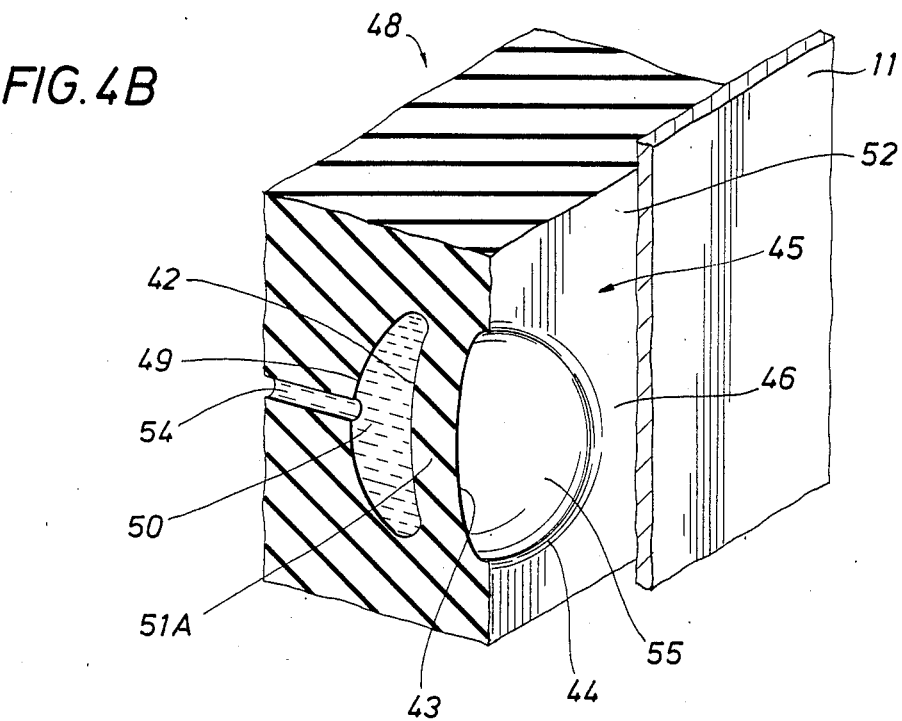

Referring now more specifically to FIG. 4B the manipulator apparatus 25 (FIG. 1) can be seen to be comprised of two elements, the suction member means 48 and the suction means 54. Suction member means 48 can be seen to have at least one suction chamber 49 containing fluid 50, the suction chamber 49 being defined in the interior of the suction member means. The suction member means 48 can be seen to have an outer surface 52 geometrically shaped to advantageously conform to the object 11 to be manipulated.

The suction member means 48 can be seen to have a moveable wall 51A, in this preferred embodiment consisting of the same material which forms the suction member means 48, such as a flexible rubber-like membrane material formed from rubber well known to the art. The moveable wall 51A has an inner side surface 42 and an outer side surface 43, the inner side surface 42 shown contacting the fluid 50, the outer side surface 43 shown forming a portion of the outer surface 52. For purposes of further description, the boundary of the outer side surface 43 is shown defining a perimeter 44 around the outer side surface 43.

A seal 45 shown having a sealing surface 46, the sealing surface forming a portion of the outer surface 52, is shown formed adjacent the perimeter 44 of the outer side surface 43 of the moveable wall 51A. Seal 45 is initially formed by pressing sealing surface 46 against the object 11 to be manipulated, the seal 45 shown engaged in a fluid tight manner with the object 11.

A suction cavity 55 is shown defined in a concave manner inwardly from the seal 45 formed on the outer surface 52 of the suction member means 48. The suction cavity 55 is capable of exerting a suction grip on the object 11, as is well known to the art.

To form the suction cavity 55, suction means 54 are placed in fluid communication with and are capable of removing a portion of the fluid 50 from the suction chamber 49. The fluid 50 when removed from the suction chamber 49 after the sealing surface 46 has been pressed in a fluid tight manner against the object 11, causes the moveable wall 51A to move inward and therefore form the suction cavity 55.

The suction chambers 49A, B, C formed within suction member means 48 are shown defined in the shape for example of oblate ellipsoids. It is well recognized that such chambers 49A-C may vary in shape throughout their placement within the suction member means 48 in order to more properly grip the anticipated object 11 to be encountered. As shown in FIG. 2 the major diameter of the ellipsoid is shown placed parallel to the outer surface 52, whereas the minor diameter of the ellipsoid is shown arranged perpendicular to the outer surface 52. It is well recognized that many other shapes may be used in the design of the suction chamber 49A-C in combination with the design of the moveable flexible membrane wall 51A in order to properly grip any desired object in the most efficient manner.

The exact location, thickness and choice of material used to form the flexible membrane wall 51A shown in the above-referenced figures will of course depend upon the choice of material used to fabricate the suction member means 48, the suction pressures applied to the wall 51A, the particular depth of the body of water that the manipulator apparatus 25 will operate in, and other engineering design criteria well known to the art associated with deformable rubber-like material applications. In a similar manner the shape and location of the suction chambers 49A, B, C will also depend upon consideration of the above design criteria.

Reference to FIG. 4A shows a complete array of suction cavities 55A-C, 56A-C and 57A-C that may be utilized to effectively grip an object 11 underwater. It is well recognized that various geometric arrays may be used depending on the particular application of the apparatus 25. The greater the gripping or suction force desired to be applied between the manipulator apparatus 25 and the object 11 to be gripped then the greater the number of suction cavities 55, 56 and 57 that should be incorporated into the design of the manipulator apparatus 25.

The suction member means 48 can be seen to include resilient plate means 59 such as a single curved section of steel plate well known to the art or conversely a flexible mesh well known to the art, or a series of plates connected together upon a favorable axis to allow the member means 48 to surround the object 11 to be gripped in an advantageous manner. The resilient plate means 59 is shown operatively engaged to the remotely operated vehicle 20 by means of articulated arms 21, 22, though it is well recognized that the plate means 59 may be connected directly to the vehicle 20, or carried by a diver not shown.

The suction member means 48 can also be seen to further include at least one suction member 60 having the suction chambers 49A, B, C defined therein. The suction member 60 is shown operatively engaged to the resilient plate means 59 such as by bonding or by use of a mechanical fastening method such as bolting well known to the art. The suction member 60 shown in FIG. 2, since a portion of it forms the flexible membrane wall 51A, should preferably be constructed of a rubber-like flexible material.

In considering the proper design of the suction member 60 it is suggested that at least ¼ of the suction member means 48 formed about the suction chambers 49A-C be used to form the flexible wall 51A. The design objective is to have the outer surface 52 of a suction member 60 collapse inward forming suction cavity 55, while the rest of the suction member 60 remains relatively undeformed in order to properly support the weight and resist the forces of the object 11 to be gripped.

The suction means 54 can be seen to further include a main hydraulic circuit 63 such as formed from hydraulic tubing well known to the art which may be formed outside the suction member means 48 in close proximity with the suction chambers 49A-C. A separate hydraulic conduit 64A-C such as a length of hydraulic tubing well known to the art may be used to place the suction chambers 49A-C in full communication with the main hydraulic circuit 63. As seen in FIG. 2 the separate hydraulic conduits 64A-C passes from the main hydraulic circuit 63 through perforations 65A-C, respectively formed through the resilient plate means 59 by means well known to the art to the suction chambers 49A-C. It is well recognized that many other paths of access to the suction chambers 49A-C may also be utilized. For example, the main hydraulic circuit 63 may be connected directly to each suction chamber 49A-C by routing the hydraulic circuit 63 directly through portions of the suction member 60 to each chamber 49A-C.

Figure 3:
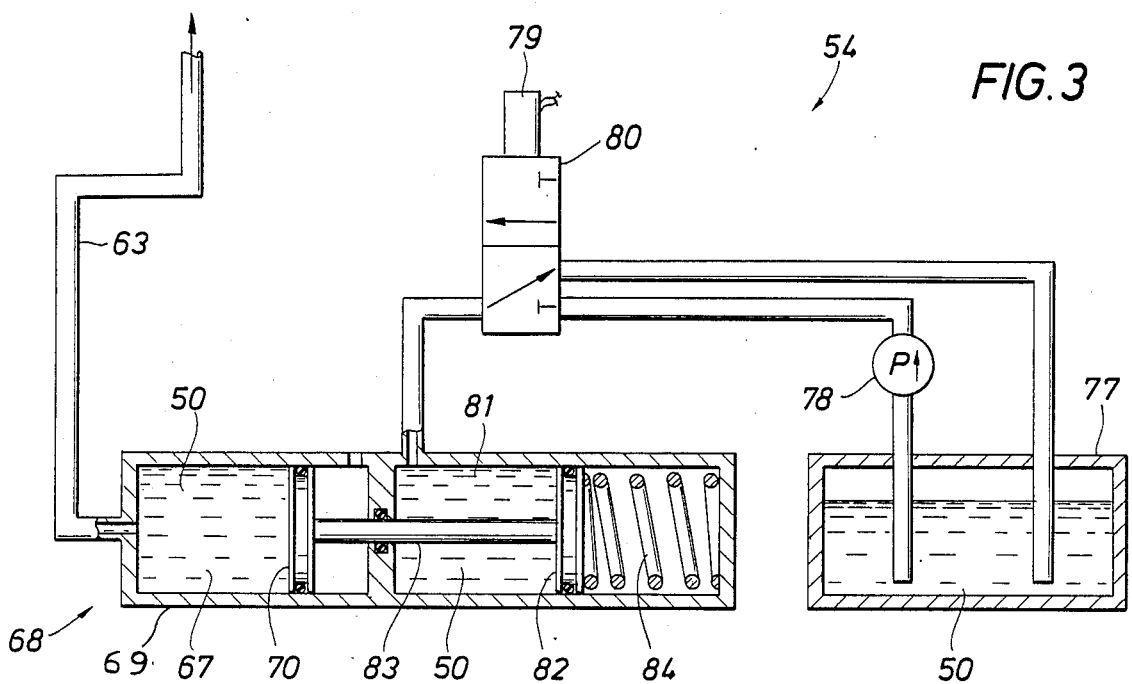
FIG. 3 is a schematic representation of a portion of the suction means of the present apparatus.

As shown in FIG. 3, the suction means 54 may further include an evacuation chamber 67 formed within the cylinder means 68. The cylinder means 68 can be seen to have a housing 69, and a moveable piston 70 at one end thereof as is well known to the art. Evacuation chamber 67 is placed in fluid communication with the main hydraulic circuit 63 in order to supply fluid 50 to or receive fluid 50 from the suction chambers 49A-C defined within the suction chamber means 48 as shown in FIG. 2.

In operation for the manipulator apparatus 25 of the preferred embodiment to grip a submerged object, the apparatus 25 outer surface 52 is forced against object 11. Fluid 50 is then removed by pump 78 from reservoir 77 and thereafter passed through solenoid 79 operated valve means 80 to pressure chamber 81. Entrance of the fluid 50 into pressure chamber 81 drives piston 82 and rod 83 against spring 84. The resultant movement of piston 70 draws fluid 50 from the suction chambers 49A-C into the evacuation chamber 67 which causes suction cavities 55A-C to subsequently form upon the surface 52 of the suction member means 48 of the manipulator apparatus 25 as shown more clearly in FIG. 4.

Upon deenergization of solenoid 79 or loss of power to the solenoid 79 and/or pumping system fluid 50 will be forced from pressure chamber 81 by spring 84 back into reservoir 77 thereby causing the fluid 50 in evacuation chamber 67 to be forced back within suction chambers 49A-C, thereby forcing the wall 51A outward from each suction chamber 49A-C which causes suction cavities 55A-C to subsequently disappear. Loss of suction cavities 55A-C causes the manipulator apparatus 25 to lose its grip upon the object 11 that it is manipulating and thereby allows the remotely operated vehicle 20 to become detached from the object 11, if a R.O.V. 20 is used to initially contact the apparatus 25 to the object 11, either by operator control or during loss of power to the remotely operated vehicle 20. In this fashion the remotely operated vehicle 20 becomes unstuck from the object 11 upon a complete loss of power to the vehicle 20, which allows the vehicle 20 to be retrieved easily to the surface.

Note that the system design allows the evacuation chamber 67, the main hydraulic circuit 63, the separate hydraulic conduits 64A-C, and the suction chambers 49A-C to remain isolated from the body of water in order to prevent contamination of the system from foreign material located either in the body of water or subsequently broken loose from the surface of the object 11 as the manipulator apparatus 25 attempts to establish a suction grip upon the object 11. Fluid 50 thereby tends not to become contaminated with foreign material which increases the system's reliability.

Figure 5:
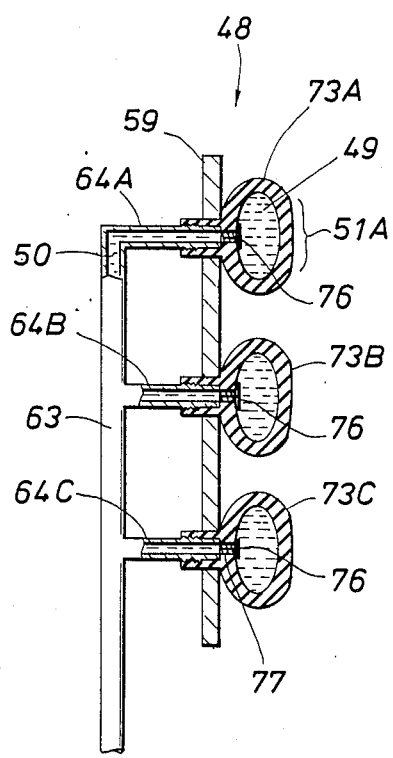
FIGS. 5, 5A are a schematic representation of an alternative embodiment of the present invention, showing independent suction member pods forming a portion of the manipulator apparatus.
Figure 5A:
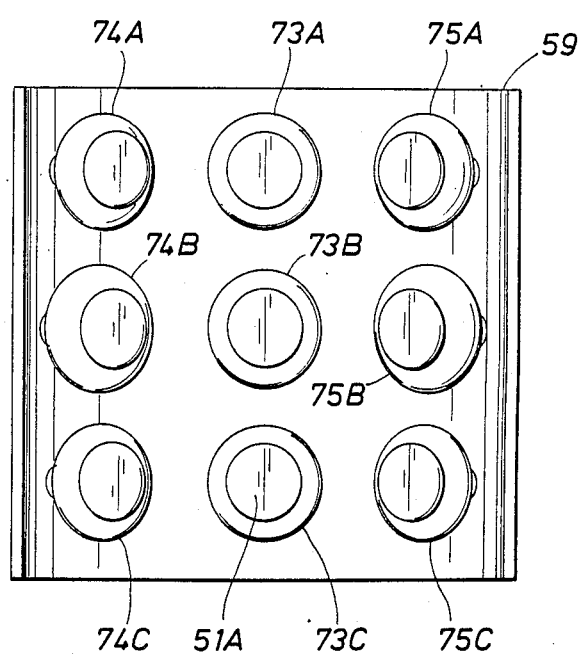

Referring now to FIGS. 5, 5A in an alternative embodiment of the present invention the suction member means 48 may be seen to be comprised of a resilient plate means 59 and individual suction members 73A-C. Each suction member 73A-C again has a flexible membrane wall 51A, as discussed previously formed from a rubber-like flexible material. The wall 51A deforms inwardly to form a suction cavity 55 after contact with an object 11 as discussed earlier.

Puncture of one wall 51A, however, does not disable the entire apparatus 25. In the event of puncture individual rupture check valves 76 may be installed in the hydraulic conduits leading to the main hydraulic circuit 63, by means well known to the art. A spring 77 incorporated within each rupture check valve 76 may be sized to maintain the check valve 76 open during normal flow rates from the entire array of suction chambers 49 A-C as evacuation chamber 67 (FIG. 3) is filled with fluid 50 or as the suction members 73A-C are initially bumped up against the object to be gripped. In the event of a rupture of a single suction member 73A-C, however, the excess evacuation flow from that particular suction member, for example, 73A would cause that particular rupture check valve 76 to shut and by proper construction of its sealing surface remain shut thereby isolating that particular suction member 73 from the other suction members 73B, 73C.

Isolation of a single suction member 73A for example will not significantly reduce the gripping action of an entire array of suction members 73A-C, 74A-C and 75A-C as shown in FIG. 5A for example. Proper design of suction members 73, 74, 75 may also allow underwater replacement of suction members 73, 74, 75 by for example the use of work engaging arms 26, 27 (FIG. 1) of the remotely operated vehicle 20. In this fashion, the vehicle 20 may fix ruptured components of its own manipulator apparatus 25 underwater. It is also well recognized that isolation valves (not shown) may be incorporated in the main hydraulic circuit 63 so that they may be operated by the work engaging arms 26, 27 of the vehicle 20 in order to isolate particular conduits 64A-C that access ruptured suction members 73.

It is advantageous to use separate suction members 73, since if the suction member 60 (shown in FIG. 4) is ruptured, the entire member 60 still containing useful suction chambers 49A-C may have to be discarded. It is also more expensive to fabricate member 60, than it would be to fabricate individual members 73A-C.

Referring now to FIG. 6 in an alternative embodiment it is well recognized that the resilient plate means 59 may be fabricated from a flexible material such as a metal mesh in order to allow the suction members 73 (FIG. 5) to actively engage the various contours that may be encountered upon the cylindrical structure 11. It should be noted that since the flexible membrane wall 51A of each suction member 73 effectively seals off each suction member 73 when collapsed, only one or two suction members 73 need actively engage the cylindrical structure 11 in order for a sufficient suction cavity 55 to be formed and thereby hold the vehicle 20 positioned adjacent the cylindrical structure 11.

Referring now to FIG. 7 in an alternative embodiment of the present invention it is well recognized that the resilient plate means 59 may be contoured to form a portion of the suction chamber 49. A suction member 85 may be used to seal the suction chamber 49 from the body of water and also form a moveable (flexible membrane) wall 51 as discussed earlier that is capable of deforming inward and forming a suction cavity 55 (shown in FIG. 4).

In the previous discussion of FIGS. 2, and 4-7 the moveable wall 51 comprises the flexible membrane wall 51A having particular rubber-like properties. Referring now to FIG. 8, it should be well recognized that the moveable wall 51B may comprise in an alternative embodiment a piston 88 slideably engaged in a fluid tight manner with a housing 87 formed in the shape of a cylinder 86 by a portion of the suction member means 48. Piston 88 moves further within the suction chamber 49 when fluid 50 is removed by the suction means 54 from the suction member means 48. Removal of fluid 50 in this manner and subsequent movement of piston 88 insures the continued existence of seal 45 having a particular sealing surface 46 formed in a fluid tight manner with object 11. As can be seen in FIG. 8 the rubber-like flexible membrane wall 51A may be replaced with a moveable wall 51B formed from piston 88. O-ring 89 allows the piston 88 to form a fluid tight seal with the cylinder 86, as is well known to the art whereas retainer ring 90 allows the piston 88 and O-ring 89 to be removed for inspection and/or maintenance.

Many other variations and modifications may be made in the apparatus and techniques hereinbefore described by those having experience in this technology without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. Manipulator apparatus adapted for use in manipulating submerged objects, said manipulator apparatus comprising:

suction member means having at least one suction chamber containing fluid defined in the interior thereof, said suction member means having a moveable wall formed in a fluid-tight moveable manner between a portion of said at least one suction chamber and a surface of said suction member means placed in contact with said object to be manipulated, and suction means placed in fluid communication with and being capable of removing a portion of said fluid from said at least one suction chamber, said fluid when removed causing said moveable wall to move toward the interior of said suction member means and to form a suction cavity between said surface and said object capable of exerting a suction grip on said object.

2. Manipulator apparatus for use in manipulating submerged objects located in a body of water, said manipulator apparatus comprising;

suction member means having;

at least one suction chamber containing fluid defined in the interior thereof, an outer surface, a moveable wall formed in a fluid-tight moveable manner between a portion of said at least one suction chamber and said outer surface, said moveable wall having an inner side surface and an outer side surface, said inner side surface contacting said fluid, said outer said surface forming a portion of said outer surface, the boundary of said outer side surface defining a perimeter around said outer side surface, and a seal having a sealing surface, said sealing surface forming a portion of said outer surface, said seal formed adjacent said perimeter of said outer side surface of said moveable wall, said seal engaged in a fluid-tight manner with said object to be manipulated, a suction cavity being defined in a concave manner inwardly from said seal in said suction member means, said suction cavity capable of exerting a suction grip on said object, and suction means placed in fluid communication with and being capable of removing a portion of said fluid from said at least one suction chamber, said fluid when removed after asid sealing surface has been pressed in a fluid-tight manner against said object to be manipulated causing said moveable wall to move toward the interior of said suction member means and to form said suction cavity.

3. The apparatus of claim 2 wherein said suction member means is operatively engaged to a remotely operated vehicle lowerable through said body of water.

4. The apparatus of claim 2 wherein said at least one suction chamber defined in the interior of said suction member means forms a cylinder having a housing formed by a portion of said suction member means, and wherein said moveable wall further comprises a piston slideably engaged in a fluid-tight manner with said housing, and wherein said piston moves further within said at least one suction chamber when said fluid is removed by said suction means.

5. The apparatus of claim 2 wherein said moveable wall of said suction member means further comprises a moveable rubber-like flexible membrane wall, and wherein said moveable rubber-like flexible membrane wall deforms toward the interior of said suction member when said fluid is removed by said suction means from said at least one suction chamber.

6. The apparatus of claim 2 wherein said suction member means further includes resilient plate means and at least one suction member having said at least one suction chamber defined therein, said at least one suction member operatively connected to said resilient plate means.

7. The apparatus of claim 5 wherein said at least one suction chamber is defined in the shape of an oblate ellipsoid within said suction member means.

8. The apparatus of claim 5 wherein said flexible membrane wall forms at least one-fourth of the suction member means formed about said at least one suction chamber.

9. The apparatus of claim 2 wherein said suction means further includes;

a main hydraulic circuit formed outside said suction member means in proximity with said at least one suction chamber, a separate hydraulic conduit placing said at least one suction chamber in fluid communication with said main hydraulic circuit.

10. The apparatus of claim 9 wherein said separate hydraulic conduit passes from said main hydraulic circuit through a perforation formed through said suction member means to said at least one suction chamber.

11. The apparatus of claim 9 further including an evacuation chamber formed within cylinder means, said cylinder means having a housing and a moveable piston at one end thereof, said evacuation chamber placed in fluid communication with said main hydraulic circuit for supplying fluid to and receiving fluid from said at least one suction chamber defined within said suction member means.

12. The apparatus of claim 11 wherein said evacuation chamber, main hydraulic circuit, separate hydraulic conduit, and said at least one suction chamber remain isolated from said body of water.

13. Manipulator apparatus adpated to be used in manipulating submerged objects located in a body of water, said manipulator apparatus comprising:

suction member means having at least one suction chamber capable of containing fluid defined in the interior thereof and having a sealing surface contactable with said object to be manipulated, said suction member means having a moveable wall formable in a fluid-tight moveable manner between a portion of said at least one suction chamber and said sealing surface, and suction means capable of being placed in fluid communication with and being capable of removing a portion of said fluid from said at least one suction chamber, the removal of said fluid capable of causing said moveable wall to move toward the interior of said suction member means and thereby to form a suction cavity between a portion of said sealing surface and said object, said suction cavity capable of exerting a suction grip on said object.

* * * * *